(12) United States Patent  (10) Patent No.: US 8,640,014 B2
Mo et al.                   (45) Date of Patent:     Jan. 28, 2014

(54) SOFT BIT METRIC GENERATION

(75) Inventors: Fan Mo, Cuyahoga Heights, OH (US);
Sameep Dave, Cuyahoga Heights, OH (US); Christian Rasmussen, Kgs. Lyngby (DK); Mehmet Aydinlik, Maynard, MA (US)

(73) Assignee: Acacia Communication Incorporated, Maynard, MA (US)

( * ) Notice: Subject to any disclaimer, the term of this patent is extended or adjusted under 35 U.S.C. 154(b) by 140 days.

(21) Appl. No.: 13/413,905

(22) Filed: Mar. 7, 2012
(Under 37 CFR 1.47)

(65) Prior Publication Data

US 2012/0230379 A1    Sep. 13, 2012

Related U.S. Application Data

(60) Provisional application No. 61/449,822, filed on Mar. 7, 2011.

(51) Int. Cl.
*H03M 13/03* (2006.01)
*H03M 13/00* (2006.01)
*H04L 27/06* (2006.01)

(52) U.S. Cl.
USPC ............................ 714/794; 714/780; 375/341

(58) Field of Classification Search
USPC ................. 714/780, 794, 752, 755, 757, 774, 714/795–796, 799; 375/341, 340, 262, 375/240.27; 455/67.11, 57.13; 370/203, 370/204, 241, 242
See application file for complete search history.

(56) References Cited

U.S. PATENT DOCUMENTS

| 5,805,977 | A | * | 9/1998 | Hill et al. .................. 340/7.22 |
| 5,930,272 | A | * | 7/1999 | Thesling ..................... 714/752 |
| 6,697,441 | B1 | | 2/2004 | Bottomley et al. |
| 7,623,602 | B2 | * | 11/2009 | Guess et al. ................ 375/347 |
| 2006/0126761 | A1 | | 6/2006 | Bernhardsson et al. |

* cited by examiner

*Primary Examiner* — Christine Tu
(74) *Attorney, Agent, or Firm* — Anderson Gorecki & Rouille LLP

(57) ABSTRACT

Soft bit metric generation computational complexity can be reduced by identifying and utilizing only the dominant terms in a reliability calculation such as a logarithmic likelihood ratio (LLR). The dominant terms are those terms for which the signs of the x and y components match those of channel outputs of the channel outputs. One technique for identifying the dominant terms is by determining the most likely transitions from two consecutive channel output samples Values for the dominant terms can be estimated by either the joint reliability of two consecutive samples of the in-phase component $(x_1, x_2)$ or by the joint reliability of two consecutive samples of the quadrature components $(y_1, y_2)$.

21 Claims, 7 Drawing Sheets

402 ⎯                    Table 400

| SNR estimate in dB | (-∞ 5.25) | [5.25 5.65) | [5.65 6.45) | [6.45 6.85) | [6.85 7.65) | [7.65 9.25) | [9.25 10.85) | [10.85 13.65) | [13.65 ∞) |
|---|---|---|---|---|---|---|---|---|---|
| c(0) | 2 | 2 | 2 | 2 | 2 | 2 | 1 | 1 | 1 |
| c(1) | 2 | 2 | 2 | 2 | 1 | 1 | 1 | 1 | 0 |
| c(2) | 2 | 1 | 1 | 1 | 1 | 1 | 1 | 0 | 0 |
| c(3) | 1 | 1 | 1 | 1 | 1 | 1 | 0 | 0 | 0 |
| c(4) | 1 | 1 | 1 | 1 | 1 | 0 | 0 | 0 | 0 |
| c(5) | 1 | 1 | 1 | 0 | 0 | 0 | 0 | 0 | 0 |
| c(6) | 1 | 1 | 0 | 0 | 0 | 0 | 0 | 0 | 0 |
| c(7) | 0 | 0 | 0 | 0 | 0 | 0 | 0 | 0 | 0 |

*Figure 3*

Table 500

| Case index | Most likely transition $(b_1, b_2)$ | Second most likely transition $(b_1, b_2)$ | Reliability assignment for $b_1$ | Reliability assignment for $b_2$ |
|---|---|---|---|---|
| A | 11 | 10 | $G(y_1, y_2)$ | $G(x_1, x_2)$ |
| B | 01 | 11 | $G(x_1, x_2)$ | $G(y_1, y_2)$ |
| C | 00 | 01 | $G(y_1, y_2)$ | $G(x_1, x_2)$ |
| D | 10 | 00 | $G(x_1, x_2)$ | $G(y_1, y_2)$ |
| E | 11 | 01 | $G(y_1, y_2)$ | $G(x_1, x_2)$ |
| F | 01 | 00 | $G(x_1, x_2)$ | $G(y_1, y_2)$ |
| G | 00 | 10 | $G(y_1, y_2)$ | $G(x_1, x_2)$ |
| H | 10 | 11 | $G(x_1, x_2)$ | $G(y_1, y_2)$ |
| I | 10 | 11 | $G(x_1, x_2)$ | $G(y_1, y_2)$ |
| J | 01 | 11 | $G(x_1, x_2)$ | $G(y_1, y_2)$ |
| K | 00 | 01 | $G(x_1, x_2)$ | $G(y_1, y_2)$ |
| L | 10 | 00 | $G(x_1, x_2)$ | $G(y_1, y_2)$ |
| M | 11 | 01 | $G(x_1, x_2)$ | $G(y_1, y_2)$ |
| N | 01 | 00 | $G(x_1, x_2)$ | $G(y_1, y_2)$ |
| O | 00 | 10 | $G(x_1, x_2)$ | $G(y_1, y_2)$ |
| P | 10 | 11 | $G(x_1, x_2)$ | $G(y_1, y_2)$ |

*Figure 5*

SOFT BIT METRIC GENERATION

CROSS-REFERENCE TO RELATED APPLICATIONS

Priority is claimed to U.S. Provisional Patent Application Ser. No. 61/449,822, filed Mar. 7, 2011, entitled SOFT BIT METRIC GENERATION FOR DIFFERENTIALLY ENCODED QPSK, which is incorporated by reference.

BACKGROUND OF THE INVENTION

Differential encoding techniques are used by some communications systems to mitigate the undesirable effects of phase noise and channel impairments. Examples include but are not limited to Quadrature Phase Shift Keying (QPSK), Differentially Encoded QPSK (DE-QPSK), 16 Quadrature Amplitude Modulation (QAM) and 64 QAM QPSK is a form of phase shift keying in which two bits are contemporaneously modulated by selecting one of four possible carrier phase shifts (0, π/2, π, and 3π/2). QAM is a modulation technique for conveying either two analog message signals or two digital bit streams by changing the amplitudes of two carrier waves using Amplitude Shift Keying (ASK) or Amplitude Modulation (AM). When these techniques are used, a differential decoding operation is implemented at the receiver to recover the transmitted information. In particular, a "soft decision" decoder uses soft bit metric information to decode data that has been encoded with an error correcting code. The soft bit metric information indicates the reliability of each input data point, and is used to generate a better estimate of the original data than a hard decision decoder would when the data is corrupted by noise. However, soft bit metric information may be computational costly to generate.

SUMMARY OF THE INVENTION

In accordance with one aspect a method comprises: from an expression of reliability of encoded bits associated with a higher order modulation scheme, the expression including a plurality of terms, selecting dominant terms from the plurality of terms; and calculating reliability of the encoded bits based on the selected dominant terms.

In accordance with another aspect an apparatus comprises: circuitry which selects dominant terms from an expression of reliability of encoded bits associated with a higher order modulation scheme; and circuitry which calculates reliability of the encoded bits based on the selected dominant terms.

In accordance with another aspect a computer program stored on a non-transitory computer-readable medium comprises: logic for selecting dominant terms from an expression of reliability of encoded bits associated with a higher order modulation scheme; and logic for calculating reliability of the encoded bits based on the selected dominant terms.

These and other features will be apparent from the detailed description and figures.

BRIEF DESCRIPTION OF THE FIGURES

FIG. 3 illustrates a table of possible approximations for correction term c as a function of $\||a|-|b|\|$.

FIG. 5 illustrates a reliability assignment table.

DETAILED DESCRIPTION

Figure 1:
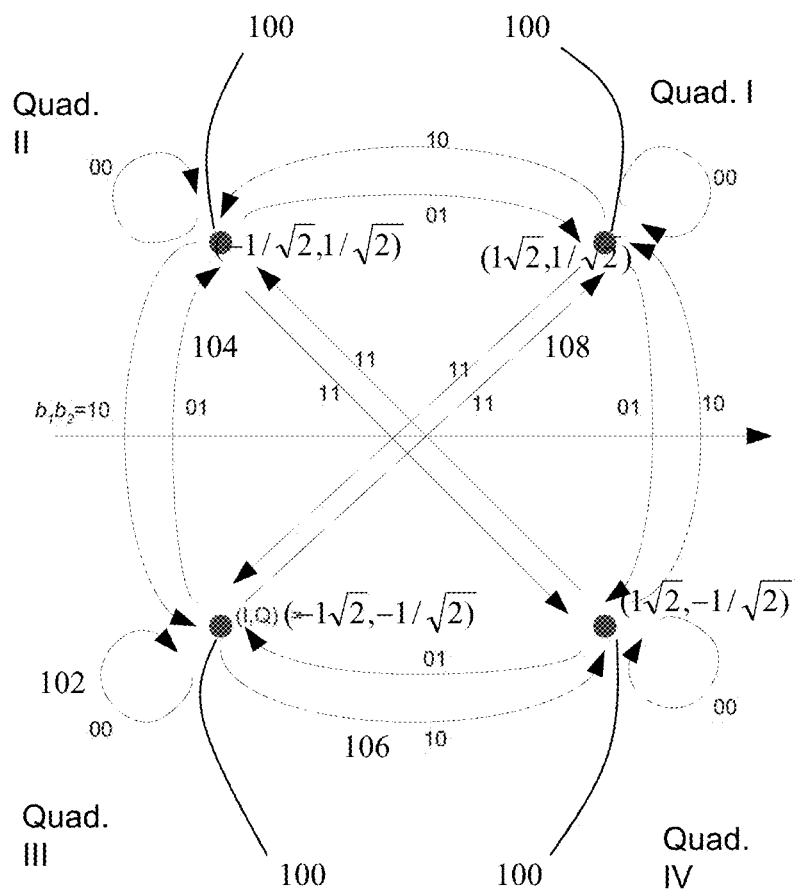
FIG. 1 illustrates differential encoding.

FIG. 1 illustrates differential encoding. Symbols 100 represent DE-QPSK outputs from a differential encoder at rotational positions labeled as (I,Q). Transitions (0°, 90° CW, 90° CCW, 180°) between outputted symbol positions are indicative of input bits denoted as b, $b_2$. For example, from $(I_{i-1}, Q_{i-1})=(-1/\sqrt{2},-1/\sqrt{2})$, if the input symbol $(b_1,b_2)$ to the differential decoder at the next time instant is 00 then no rotation is applied as indicated by transition 102, i.e., to where $(I_i,Q_i)=(-1/\sqrt{2},-1/\sqrt{2})$. However, if the input symbol at the next time instant is 01 then 90-degree clockwise rotation is applied as indicated by transition 104, i.e., to where $(I_i,Q_i)=(-1/\sqrt{2},1/\sqrt{2})$. If the input symbol at the next time instant is 10 then 90-degree counter-clockwise rotation is applied as indicated by transition 106, i.e., to where $(I_i,Q_i)=(1/\sqrt{2},-1/\sqrt{2})$. If the input symbol at the next time instant is 11 then 180-degree counter-clockwise rotation is applied as indicated by transition 108, i.e., to where $(I_i,Q_i)=(1/\sqrt{2},1/\sqrt{2})$. The symbols a transmitted on a channel and a receiver observes received values $C_t$ at times t=i−1 and t=i to recover the bits $(b_1, b_2)$ transmitted at time i.

Soft Decision Encoding/Decoding is used to enhance the accuracy of the receiver, e.g., where the transmitted symbols are distorted by memory-less additive noise and previous and future values of $C_t$ do not provide extra information about the bits. A soft decision decoder operates in response to inputted "soft metrics" which represent the reliability of each encoded bit. If $C_{t-1}$ and $C_t$ denote distorted DE-QPSK symbols at the channel output at time instants t−1 and t, respectively, these two symbols can be used to generate the soft metrics for two encoded bits denoted by $b_{1,t}$ and $b_{2,t}$. The Logarithmic-Likelihood Ratio (LLR) is used for the purposes of this description, but it should be understood that soft metrics can take various other forms which might be utilized. The general equation for the LLR of $b_{1,t}$ is:

$$llr(b_{1,t}) = \log\left(\frac{P(b_{i,t} = 1 \mid C_{t-1}, C_t)}{P(b_{i,t} = 0 \mid C_{t-1}, C_t)}\right) \quad \text{(equation 1)}$$

Similarly, the general LLR equation for $b_{2,t}$ can be written as $$llr(b_{2,t}) = \log\left(\frac{P(b_{2,t} = 1 \mid C_{t-1}, C_t)}{P(b_{2,t} = 0 \mid C_{t-1}, C_t)}\right) \quad \text{(equation 2)}$$

Equation 1 can be expressed as $$llr(b_{1,t}) = \log\left\{\frac{P(00, 10 \mid C_{t-1}, C_t) + P(00, 11 \mid C_{t-1}, C_t) +}{P(01, 00 \mid C_{t-1}, C_t) + P(01, 10 \mid C_{t-1}, C_t)} \cdots \atop \frac{P(00, 00 \mid C_{t-1}, C_t) + P(00, 01 \mid C_{t-1}, C_t) +}{P(01, 01 \mid C_{t-1}, C_t) + P(01, 11 \mid C_{t-1}, C_t)}\right\} \quad \text{(equation 3)}$$

-continued $$\begin{pmatrix} P(10,11 \mid C_{i-1},C_i) + P(10,01 \mid C_{i-1},C_i) + \\ P(11,00 \mid C_{i-1},C_i) + P(11,01 \mid C_{i-1},C_i) \\ \hline P(10,10 \mid C_{i-1},C_i) + P(10,00 \mid C_{i-1},C_i) + \\ P(11,10 \mid C_{i-1},C_i) + P(11,11 \mid C_{i-1},C_i) \end{pmatrix}$$

$P(I_{i-1}Q_{i-1},I_iQ_i|C_{i-1},C_i)$ represents the probability of transitioning from $I_{i-1}Q_{i-1}$ to $I_iQ_i$ given channel outputs $C_{t-1}$ and $C_t$. Transitions on the numerator of equation 3 are associated with $b_{1,t}=1$. Transitions on the denominator of equation 3 are associated with $b_{1,t}=0$. $llr(b_{2,t})$ can be expressed in a similar way. Assuming that each transmitted DE-QPSK signal has unity energy, the channel only adds Additive White Gaussian Noise, where the noise is complex with 0 mean and variance $\sigma^2$, $C_{t-1}=(x_1,y_1)$, where $x_1$ and $y_1$ denote the in-phase and quadrature components of channel output, respectively, and similarly $C_t=(x_2,y_2)$, equation 3 can be expressed as:

$$llr(b_{1,t}) = \qquad \text{(equation 4)}$$

$$\log \begin{pmatrix} e^{\frac{-x_1-y_1+x_2-y_2}{\sigma^2/\sqrt{2}}} + e^{\frac{-x_1-y_1+x_2+y_2}{\sigma^2/\sqrt{2}}} + e^{\frac{-x_1+y_1-x_2-y_2}{\sigma^2/\sqrt{2}}} + \\ e^{\frac{-x_1+y_1+x_2-y_2}{\sigma^2/\sqrt{2}}} + e^{\frac{x_1-y_1+x_2-y_2}{\sigma^2/\sqrt{2}}} + e^{\frac{x_1-y_1-x_2+y_2}{\sigma^2/\sqrt{2}}} + \\ e^{\frac{x_1+y_1-x_2-y_2}{\sigma^2/\sqrt{2}}} + e^{\frac{x_1+y_1-x_2+y_2}{\sigma^2/\sqrt{2}}} \\ \hline e^{\frac{-x_1-y_1-x_2-y_2}{\sigma^2/\sqrt{2}}} + e^{\frac{-x_1-y_1+x_2-y_2}{\sigma^2/\sqrt{2}}} + e^{\frac{-x_1+y_1-x_2+y_2}{\sigma^2/\sqrt{2}}} + \\ e^{\frac{-x_1+y_1+x_2-y_2}{\sigma^2/\sqrt{2}}} + e^{\frac{x_1-y_1+x_2-y_2}{\sigma^2/\sqrt{2}}} + e^{\frac{x_1-y_1-x_2-y_2}{\sigma^2/\sqrt{2}}} + \\ e^{\frac{x_1+y_1+x_2-y_2}{\sigma^2/\sqrt{2}}} + e^{\frac{x_1+y_1+x_2+y_2}{\sigma^2/\sqrt{2}}} \end{pmatrix}$$

Also, $llr(b_{2,t})$ can be written as $$llr(b_{2,t}) = \qquad \text{(equation 5)}$$

$$\log \begin{pmatrix} e^{\frac{x_1+y_1-x_2-y_2}{\sigma^2/\sqrt{2}}} + e^{\frac{x_1+y_1+x_2-y_2}{\sigma^2/\sqrt{2}}} + e^{\frac{-x_1+y_1+x_2-y_2}{\sigma^2/\sqrt{2}}} + \\ e^{\frac{-x_1+y_1+x_2+y_2}{\sigma^2/\sqrt{2}}} + e^{\frac{-x_1-y_1+x_2-y_2}{\sigma^2/\sqrt{2}}} + e^{\frac{-x_1-y_1-x_2+y_2}{\sigma^2/\sqrt{2}}} + \\ e^{\frac{x_1-y_1-x_2-y_2}{\sigma^2/\sqrt{2}}} + e^{\frac{x_1-y_1-x_2+y_2}{\sigma^2/\sqrt{2}}} \\ \hline e^{\frac{x_1+y_1+x_2+y_2}{\sigma^2/\sqrt{2}}} + e^{\frac{x_1+y_1-x_2+y_2}{\sigma^2/\sqrt{2}}} + e^{\frac{-x_1+y_1-x_2+y_2}{\sigma^2/\sqrt{2}}} + \\ e^{\frac{-x_1+y_1-x_2-y_2}{\sigma^2/\sqrt{2}}} + e^{\frac{-x_1-y_1-x_2-y_2}{\sigma^2/\sqrt{2}}} + e^{\frac{-x_1-y_1+x_2+y_2}{\sigma^2/\sqrt{2}}} + \\ e^{\frac{x_1-y_1+x_2-y_2}{\sigma^2/\sqrt{2}}} + e^{\frac{x_1-y_1+x_2+y_2}{\sigma^2/\sqrt{2}}} \end{pmatrix}$$

Although values of equations 4 and 5 can be calculated, each equation includes sixteen terms, each one of which requires the evaluation of an exponential. Therefore, the computational complexity for these equations is relatively high.

In general, computational complexity can be reduced by identifying and utilizing only the dominant terms in a reliability calculation such as the logarithmic likelihood ratio (LLR). The dominant terms in equations 4 and 5 can be selected as, for example, those terms for which the signs of the x and y components match those of channel outputs of the channel outputs. On technique for identifying the dominant terms is by determining the most likely transitions from two consecutive channel output samples that are denoted by $C_{t-1}=(x_1,y_1)$ and $C_t=(x_2,y_2)$, where x and y denote in-phase and quadrature components of the symbol, respectively. [Moved to below] Techniques for reducing computational complexity for soft bit metric generation for differentially encoded higher order modulation schemes will now be described with regard to the example illustrated in FIG. 2.

Figure 2:
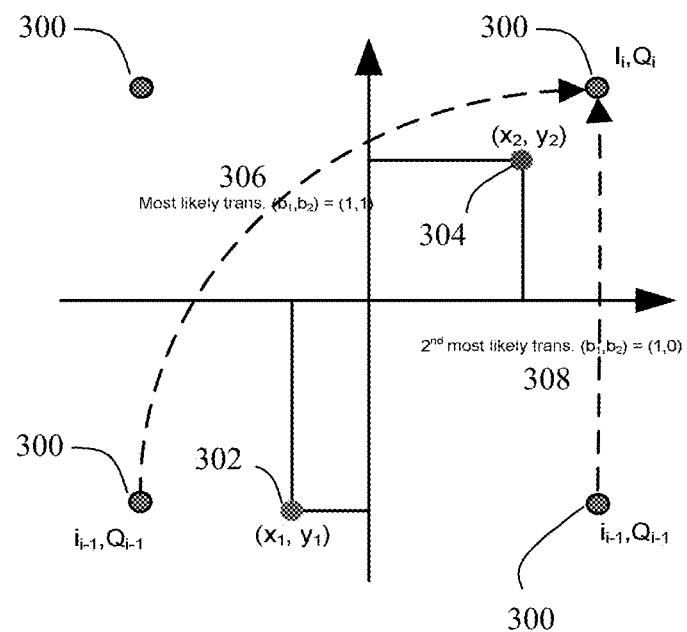
FIG. 2 illustrates an example transition.

In the example illustrated in FIG. 2 dots 300 represent the transmitted DE-QPSK symbols denoted by $(I_{i-1}, Q_{i-1})$. Dot 302 represents a corresponding noisy channel output received at time instant i−1. Similarly dot 304 denotes a corresponding noisy channel output at time instant i. The most likely transition 306 is $(b_1, b_2)=11$, i.e., transition from $(I_{i-1}, Q_{i-1})=00$ to $(I_i, Q_i)=11$. Because $x_1$ has the smallest magnitude among all, the second most likely transition 308 is $(b_1, b_2)=10$, i.e., from $(I_{i-1}, Q_{i-1})=10$ to $(I_i, Q_i)=11$, with $I_{i-1}$ flipped sign.

In at least one embodiment a "G operation" is used to calculate the reliability of encoded bits $(b_1, b_2)$ from noisy channel outputs $C_{t-1}=(x_1,y_1)$ and $C_t=(x_2,y_2)$. The G operation computes the joint reliability of two reliability values, which can be either in-phase components $(x_1, x_2)$ or quadrature components $(y_1, y_2)$. Given a and b as two reliability values, the G operation can be expressed as:

$$G(a,b)=\min(|a|,|b|)-c(a,b), \qquad \text{(equation 6)}$$

where c(a, b) is a correction term. In the illustrated example the G operation between $(x_1, x_2)$ is assigned to $b_2$ as the reliability information because the flip of $b_2$ is the most likely event. Conversely, the G operation between $(y_1, y_2)$ is assigned to $b_1$ as the reliability information.

Hard decision differential decoding can be used to indicate the most likely transition between each pair of received symbols, $C_{t-1}=(x_1, y_1)$ and $C_t=(x_2, y_2)$. In the illustrated example the hard decision differential decoder will return (1,1) since the most likely transition corresponds to $(b_1, b_2)=(1,1)$.

The signs of the bit reliabilities that are generated using the G operation are determined by hard decision differential decoding. If hard decision decoder returns 1 (0), then positive (negative) signs are assigned to the reliabilities. If the G operation returns 3 for $b_1$ and 4 for $b_2$ then positive signs are assigned to these reliabilities, i.e., $llr(b_1)=3$ and $llr(b_2)=4$.

Referring to FIG. 3, in accordance with one aspect the correction term for the G operation is obtained from a look-up table based on scaling and the signal to noise ratio estimate, e.g., Table 400 (FIG. 4), where c(a,b) is expressed as a function of $||a|-|b||$ as a further simplification. For example if the SNR estimate is 5.3 dB and $||a|-|b||=1$, then c(1)=2 is outputted by table 400 as indicated by entry 402.

Figure 4:
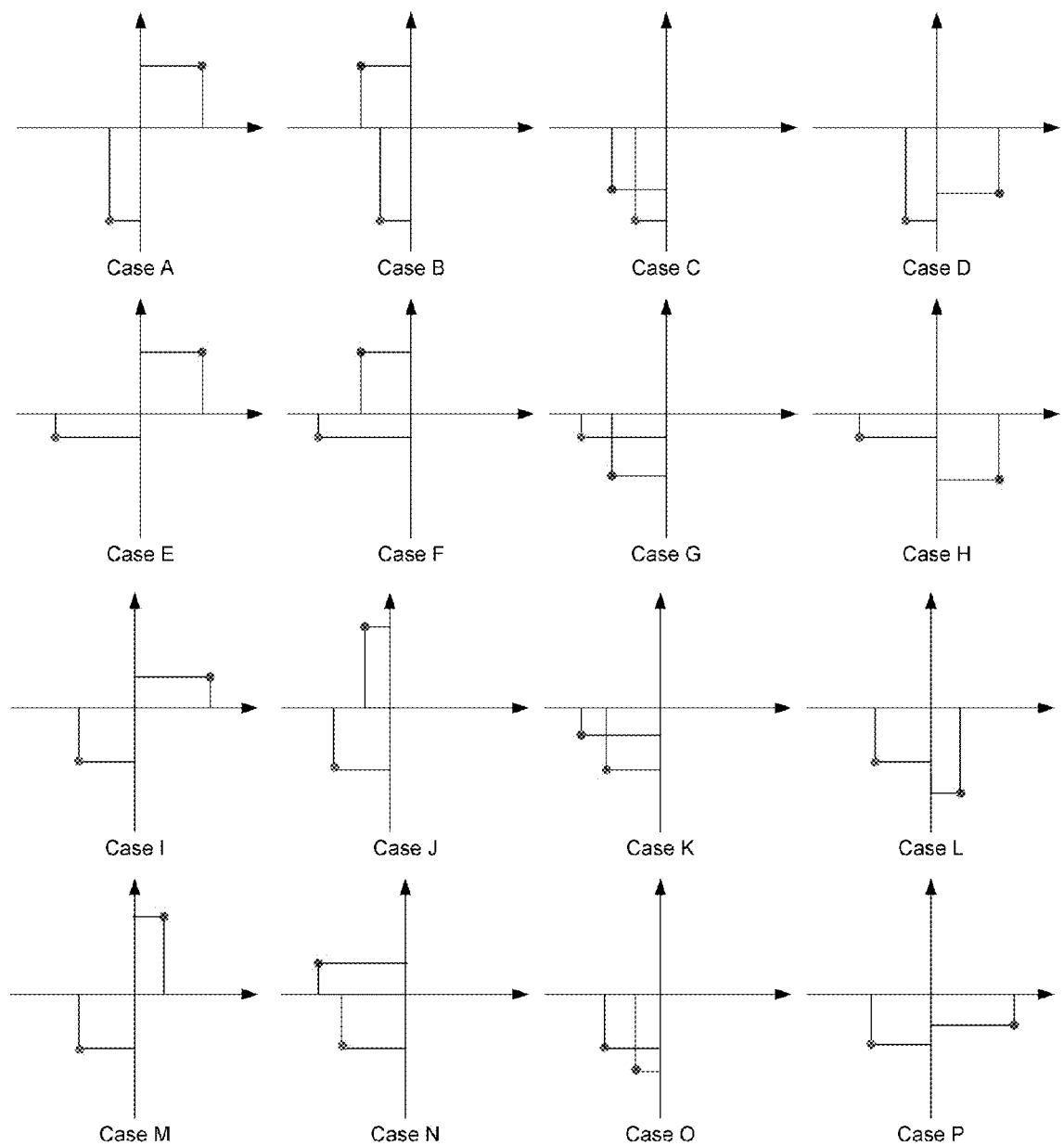
FIG. 4 illustrates an analysis of the most likely and second most likely transitions over cases A through P, assuming $(x_1, y_1)$ is always in the third quadrant, and $(x_2, y_2)$ is moving from $1^{st}$ quadrant to $4^{th}$ quadrant in each row.

FIG. 4 illustrates an analysis of the most likely and second most likely transitions over cases A through P, assuming $(x_1, y_1)$ is always in the third quadrant, and $(x_2, y_2)$ is moving from $1^{st}$ quadrant to $4^{th}$ quadrant in each row. In row 1, $x_1$ has the smallest magnitude for cases A to D. In row 2, $y_1$ has the smallest magnitude for cases E to H. In row three, $y_2$ has the smallest magnitude in the first quadrant for case I, and cases J to L show rotation by 90, 180 and 270 degrees. In row 4, $x_2$ has the smallest magnitude in the first quadrant for case I, and cases N to P show rotation by 90, 180 and 270 degrees. Cases A through P combined cover all relative magnitude possibilities with $(x_1, y_1)$ in the $3^{rd}$ quadrant. Referring to FIG. 5, by analyzing cases A through P it can be determined that four of the cases, namely A, C, E and G, shall have the G operation between $(x_1, x_2)$ assigned to $b_2$ and the G operation between $(y_1, y_2)$ assigned to $b_1$ as indicated by Table 500. In all other cases the G operation between $(x_1, x_2)$ should be assigned to $b_1$ and the G operation between $(y_1, y_2)$ should be assigned to $b_2$. Although only the cases where $(x_1, y_1)$ is in the third quadrant are described above, all other cases with $(x_1, y_1)$ in other quadrants will also be analyzed.

Figure 6:
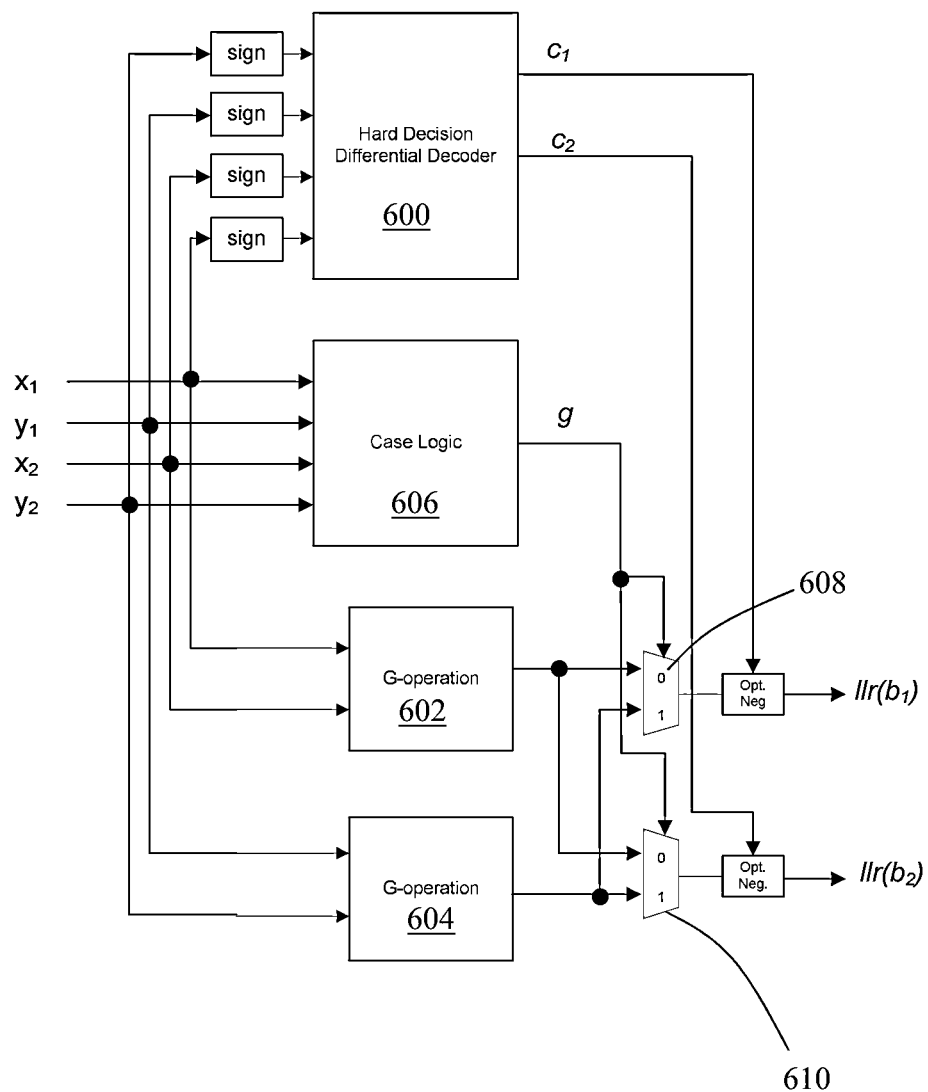
FIG. 6 illustrates a block diagram of circuitry for soft bit metric generation.

FIG. 6 is a block diagram of circuitry for soft bit metric generation. A Hard Decision differential decoder 600 indicates the most likely transition between each pair of received symbols, $C_{t-1}=(x_1, y_1)$ and $C_t=(x_2, y_2)$. The G operation is performed separately on x ($x_1$, $x_2$) and y ($y_1$, $y_2$) components for all cases in table 500 (FIG. 5) using G operation blocks 602, 604. G operation assignment to $b_1$ or $b_2$ is determined by the case index. Consequently, x and y components are applied to G operation blocks 602, 604 separately. A "Case Logic" block 606 determines if the output of two G operations should be swapped by logic 608, 610 based on the case index as described in table 500 (FIG. 5). The Case Logic block 606 computes output g from ($x_1$, $x_2$) and ($y_1$, $y_2$) as:

$$g = (d_1 \oplus e_1) \oplus (f \cdot \overline{((d_1 \oplus e_1) \oplus (d_2 \oplus e_2))}) \quad \text{(equation 7)}$$

where $$d_n = \begin{cases} 1, & x_n \geq 0 \\ 0, & \text{otherwise} \end{cases} \quad \text{(equation 8)}$$

$$e_n = \begin{cases} 1, & y_n \geq 0 \\ 0, & \text{otherwise} \end{cases} \quad \text{(equation 9)}$$

$$f = \begin{cases} 1, & \min(x_1, y_1) < \min(x_2, y_2) \\ 0, & \text{otherwise} \end{cases} \quad \text{(equation 10)}$$

and where $\oplus$; denotes logical XOR and AND operations, respectively. A line drawn above the expression denotes logical NOT. The hard decision differential decoder 600 implements the following equations for the differential encoding scheme:

$$c_1 = (d_1 \oplus d_2) \oplus ((d_1 \oplus e_1) \cdot (\overline{d_2} \oplus e_2))$$

$$c_2 = (e_1 \oplus e_2) \oplus ((d_1 \oplus e_1) \cdot (\overline{e_2} \oplus e_2))$$

where llr(b1) and llr(b2) values are signed by $C_1$ and $c_2$ ($C''=1$ indicates a positive number).

Figure 7:
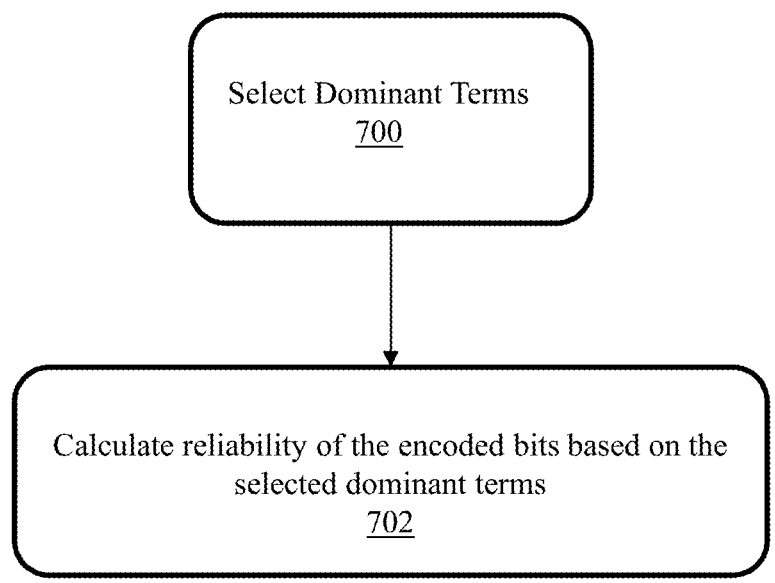
FIG. 7 is a flow diagram of a method for soft bit metric generation.

FIG. 7 is a flow diagram of a method for soft bit metric generation. The method includes selecting the dominant terms in a reliability calculation such as the logarithmic likelihood ratio (LLR) as indicated by step 700. One technique for identifying the dominant terms is by determining the most likely transitions from two consecutive channel output samples that are denoted by $C_{t-1}(x_1, y_1)$ and $C_t=(x_2, y_2)$, where x and y denote in-phase and quadrature components of the symbol, respectively. The dominant terms in equations 4 and 5 can be selected as, for example, those terms for which the signs of the x and y components match those of channel outputs of the channel outputs. Reliability of the encoded bits is then calculated based on the selected terms as indicated by step 702. Values for the above-mentioned dominant terms can be estimated by either the joint reliability of two consecutive samples of the in-phase component ($x_1, x_2$) or by the joint reliability of two consecutive samples of the quadrature components ($y_1, y_2$).

It will be appreciated that the invention is not limited to QPSK or other features which have been used to provide context for the describe above. Further, aspects may be implemented using general purpose electronic hardware, purpose-designed electronic hardware, computer program code stored on a non-transitory computer-readable medium and operated upon by a general or purpose-designed processor, or any combinations thereof. Furthermore, while the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
   from an expression of reliability of encoded bits associated with a higher order modulation scheme, the expression including a plurality of terms, selecting dominant terms from the plurality of terms; and
   calculating reliability of the encoded bits based on the selected dominant terms.

2. The method of claim 1 including identifying the dominant terms by determining the most likely transitions from two consecutive channel output samples.

3. The method of claim 1 including approximating the dominant terms based on joint reliability of two consecutive samples of an in-phase component.

4. The method of claim 1 including approximating the dominant terms based on joint reliability of two consecutive samples of quadrature components.

5. The method of claim 1 including approximating the dominant terms based on joint reliability with a function $G(a, b) = \min(|a|, |b|) - c(a, b)$.

6. The method of claim 5 including obtaining correction term $c(a, b)$ from a set of pre-calculated terms.

7. The method of claim 1 including determining a sign to associate with a soft metric from hard decision differential decoding.

8. Apparatus comprising:
   circuitry which selects dominant terms from an expression of reliability of encoded bits associated with a higher order modulation scheme; and
   circuitry which calculates reliability of the encoded bits based on the selected dominant terms.

9. The apparatus of claim 8 including circuitry which identifies the dominant terms by determining the most likely transitions from two consecutive channel output samples.

10. The apparatus of claim 8 including circuitry which approximates the dominant terms based on joint reliability of two consecutive samples of an in-phase component.

11. The apparatus of claim 8 including circuitry which approximates the dominant terms based on joint reliability of two consecutive samples of quadrature components.

12. The apparatus of claim 8 including circuitry which approximates the dominant terms based on joint reliability with a function $G(a, b) = \min(|a|, |b|) - c(a, b)$.

13. The apparatus of claim 12 including circuitry which obtains correction term $c(a, b)$ from a set of pre-calculated terms.

14. The apparatus of claim 8 including circuitry which determines a sign to associate with a soft metric from hard decision differential decoding.

15. A computer program stored on a non-transitory computer-readable medium comprising:
   logic for selecting dominant terms from an expression of reliability of encoded bits associated with a higher order modulation scheme; and
   logic for calculating reliability of the encoded bits based on the selected dominant terms.

16. The computer program of claim 15 including logic for identifying the dominant terms by determining the most likely transitions from two consecutive channel output samples.

17. The computer program of claim 15 including logic for approximating the dominant terms based on joint reliability of two consecutive samples of an in-phase component.

18. The computer program of claim 15 including logic for approximating the dominant terms based on joint reliability of two consecutive samples of quadrature components.

19. The computer program of claim 15 including logic for approximating the dominant terms based on joint reliability with a function $G(a, b) = \min(|a|,|b|) - c(a, b)$.

20. The computer program of claim 19 including logic for obtaining correction term $c(a, b)$ from a set of pre-calculated terms.

21. The computer program of claim 15 including logic for determining a sign to associate with a soft metric from hard decision differential decoding.

* * * * *